United States Patent [19]
Schofield

[11] Patent Number: 5,943,674
[45] Date of Patent: Aug. 24, 1999

[54] DATA STRUCTURE REPRESENTING AN INTERFACE DEFINITION LANGUAGE SOURCE FILE

[75] Inventor: Andrew Schofield, Cham, Switzerland

[73] Assignee: Tandem Computers Incorporated, Cupertino, Calif.

[21] Appl. No.: 08/678,298

[22] Filed: Jul. 11, 1996

[51] Int. Cl.[6] ........................... G06F 17/30
[52] U.S. Cl. ............... 707/104; 395/705; 395/708; 707/100
[58] Field of Search .................. 707/200, 201, 707/202, 203, 100, 101, 104; 395/700, 703, 705, 708

[56] References Cited

U.S. PATENT DOCUMENTS

| | | | |
|---|---|---|---|
| 5,493,675 | 2/1996 | Fiaman, Jr. et al. | 395/700 |
| 5,577,253 | 11/1996 | Blickstein | 395/705 |
| 5,613,117 | 3/1997 | Davidson et al. | 395/708 |
| 5,640,567 | 6/1997 | Phipps | 395/703 |
| 5,659,753 | 8/1997 | Murphy et al. | 395/705 |
| 5,671,416 | 9/1997 | Elson | 395/702 |
| 5,675,805 | 10/1997 | Boldo et al. | 395/706 |
| 5,701,490 | 12/1997 | Safanov | 395/705 |
| 5,758,163 | 5/1998 | Safanov | 395/708 |
| 5,761,511 | 6/1998 | Gibbons et al. | 395/705 |
| 5,768,564 | 6/1998 | Andrews et al. | 395/500 |

*Primary Examiner*—Thomas G. Black
*Assistant Examiner*—Michael J. Wallace
*Attorney, Agent, or Firm*—Graham & James LLP

[57] ABSTRACT

A data structure representing an Interface Definition Language ("IDL") source file is disclosed. The data structure is preferably produced during the compilation of the source file and generation of language-specific source code. The data structure includes a variable-sized array of data structures representing entries from the source file in addition to an array of strings containing each line in the source file. Each of the entry data structures contains a fixed part containing information about the name and attributes of the source file entry and a variable part that depends upon the entry's data type. The data structure can be stored in a file or database for run-time access by distributed applications.

11 Claims, 3 Drawing Sheets

DATA STRUCTURE REPRESENTING AN INTERFACE DEFINITION LANGUAGE SOURCE FILE

RELATED APPLICATIONS

The following related U.S. applications are hereby incorporated by reference: U.S. application Ser. No. 08/680,270 (attorney docket number 23896.231) entitled "Method and Apparatus for Describing an Interface Definition Language-Defined Interface, Operation, and Data Type" by A. Schofield, filed Jul. 11, 1996; U.S. application Ser. No. 08/678,681 (attorney docket number 23896.232) entitled "Method and Apparatus Using Parameterized Vectors For Converting Interface Definition Language-Defined Data Structures Into a Transport and Platform Independent Format" by A. Schofield, filed Jul. 11, 1996; U.S. application Ser. No. 08/680,203 (attorney docket number 23896.234) entitled "Method and Apparatus for Transporting Interface Definition Language-Defined Data Structures Between Heterogeneous Systems" by A. Schofield, filed Jul. 11, 1996; U.S. application Ser. No. 08/680,206 (attorney docket number 23896.235) entitled "Method and Apparatus for Performing Distributed Object Calls" by A. Schofield filed Jul. 11, 1996; U.S. application Ser. No. 08/690,202 (attorney docket number 23896.236) entitled "Method and Apparatus for Asynchronously Calling and Implementing Objects" by A. Schofield, filed Jul. 11, 1996; U.S. application Ser. No. 08/280,266 (attorney docket number 23896.237) entitled "Method and Apparatus for Performing Distributed Object Calls using Proxies and Memory Allocation" by A. Schofield filed Jul. 11, 1996.

BACKGROUND OF THE INVENTION

1. Field of the Invention

The present invention relates to a data structure used to represent a source file written in the Object Management Group's Interface Definition Language. In particular, the data structure is a representation of an IDL translation unit and can be stored in a file or database for use as an intermediate format between IDL compilers and code generators.

2. Background

Distributed object computing combines the concepts of distributed computing and object-oriented computing. Distributed computing consists of two or more pieces of software sharing information with each other. These two pieces of software could be running on the same computer or on different computers connected to a common network. Most distributed computing is based on a client/server mode. With the client/server model, two major types of software are utilized: client software, which requests the information or service, and server software, which provides the information or service.

Object-oriented computing is based upon the object model where pieces of code called "objects"—often abstracted from real objects in the real world—own data (called "attributes" in object-oriented programming parlance) and provide services through methods (also known as "operations" or "member functions"). The data and methods contained in an object may be "public" or "private." Public data may be altered by any other object. Most data, however, is private and accessible only to methods owned by the object. Typically, the methods operate on the private data contained in the object.

A collection of similar objects make up an interface (or "class" in C++ parlance). An interface specifies the methods and types of data contained in all objects of the interface. Objects are then created ("instantiated") based upon that interface. Each object contains data specific to that object. Each specific object is identified within a distributed object system by a unique identifier called an object reference.

In a distributed object system, a client sends a request (or "object call") containing an indication of the operation for the server to perform, the object reference, and a mechanism to return "exception information" (unexpected occurrences) about the success or failure of a request. The server receives the request and, if possible, carries out the request and returns the 25 appropriate exception information. An object request broker ("ORB") provides a communication hub for all objects in the system passing the request to the server and returning the reply to the client.

On the client side, the ORB handles requests for the invocation of a method and the related selection of servers and methods. When an application sends a request to the ORB for a method to be performed on an object, the ORB validates the arguments contained in the request against the interface and dispatches the request to the server, starting it if necessary. On the server side, the ORB receives such requests, unmarshals the arguments, sets up the context state as needed, invokes the method dispatcher, marshals the output arguments, and returns the results to the client, thereby completing the object invocation.

Both client and server must have information about the available objects and methods that can be performed. Through the hiding of private data ("encapsulation" in object-oriented parlance), the client does not need to know how the request will be carried out by the server. Nevertheless, both client and server must have access to common interface definitions to enable communication therebetween. Currently, the standard language for distributed object computing is the Object Management Group's ("OMG") Interface Definition Language ("IDL").

IDL interfaces define a set of operations that a client can invoke on an object. An interface can declare one or more exceptions, which indicate that an IDL operation did not perform successfully. Operations may receive parameters and return a return value. Each parameter to an operation may have a "direction" that indicates whether the value is passed from client to server ("in"), from server to client ("out"), or in both directions ("inout"). The parameter also has a data type that constrains its possible values. Operations may also optionally have a "one-way" attribute, which specifies which invocation semantics the communication service must provide for invocations of a particular operation. When a client invokes an operation with the one-way attribute, the invocation semantics are "best-effort", implying that the operation will be implemented by the server at most once. If an attempt to implement the operation fails, the server does not attempt to implement the operation again. An operation with the one-way attribute must specify a void return type and must not contain any output parameters.

Data types are used to describe the accepted values of IDL operation parameters, exceptions, and return values. IDL supports two categories of data types: basic and compound. Basic types include short integers, long integers, long long integers, unsigned long integers, unsigned short integers, floating points, double, character, boolean, and octet. Compound types include enum, string, struct, array, union, sequence, and "any" types. The struct type is similar to a C structure; it lets interface designers create a complex data type using one or more type definitions. The sequence type lets interface designers pass a variable-size array of objects. The "any" type can represent any possible data type—basic or compound.

IDL is designed to be used in distributed object systems implementing OMG's Common; Object Request Broker Architecture ("CORBA"). In a typical CORBA system, interface definitions are written in an IDL-defined source file (also known as a "translation unit"). The source file is compiled by an IDL compiler that maps the source file to a specific programming language. The IDL compiler generates programming-language-specific files, including client stub files, header files, and server skeleton files. Client stub files are then compiled and linked into client applications and are used to make requests. Header files are linked into client and server applications and are used to define data types. Server skeleton files are linked into server applications and are used to map client operations on objects (requests) to methods in a server implementation.

An IDL compiler typically acts as a compiler and a code generator. The compiler produces the stub, header, and skeleton files directly. The original source code is not preserved in a file or database once compiled. Access to the original source code is important, however, for generating code to help perform object calls using different models, such as RPC style stubs and message packing functions. In addition, the source code may need to be accessed to extract, edit, and recompile if changes to an IDL translation unit must be made.

CORBA does provide an interface repository to allow dynamic access to IDL interface definitions. The primary function of the interface repository, however, is to provide information for dynamically invoked requests. Thus, the interface repository contains the same information that is otherwise stored in client stubs. The original IDL source code is not directly accessible. Moreover, the interface repository contains all available interfaces in a large database, rather than specific interfaces related to a particular IDL translation unit. Access to a particular translation unit would be more flexible.

Accordingly, a need exists for an intermediate format between compilation and actual code generation that permits access to the original IDL source code.

Further, a need exists for an intermediate format that can be readily stored in a file and accessed dynamically.

Further, a need exists for an intermediate format that can represent a single IDL translation unit.

SUMMARY OF THE INVENTION

The present invention is directed to a data structure representing an IDL source file. The data structure permits access to the original IDL source code. Further, the data structure can be accessed dynamically for use as a repository.

The data structure contains a variable-sized array of entry data structures, each entry data structure representing an entry in the source file, and a variable-sized array of character strings, each character string containing a line of code in the source file. The data structure representing an entry in the source file includes a fixed part containing the entry's name and properties. The entry data structure also contains a variable part that depends upon the data type of the specified entry. Modules, interfaces, operations, constants, and other IDL types may be represented in the variable portion of the entry data structure using different types of data.

The data structure can be used to access the IDL source code directly for modification or recompilation. Moreover, the data structure can be stored and accessed dynamically for configuration and other run-time information. Since a separate data structure is generated for each source file, data can be accessed at run-time more efficiently.

A more complete understanding of the method for creating and storing data structures will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Reference will now be made in detail to the preferred embodiments of the invention, examples of which are illustrated in the accompanying drawings. Wherever possible, the same reference numbers will be used throughout the drawings to refer to the same or like parts.

Figure 1:
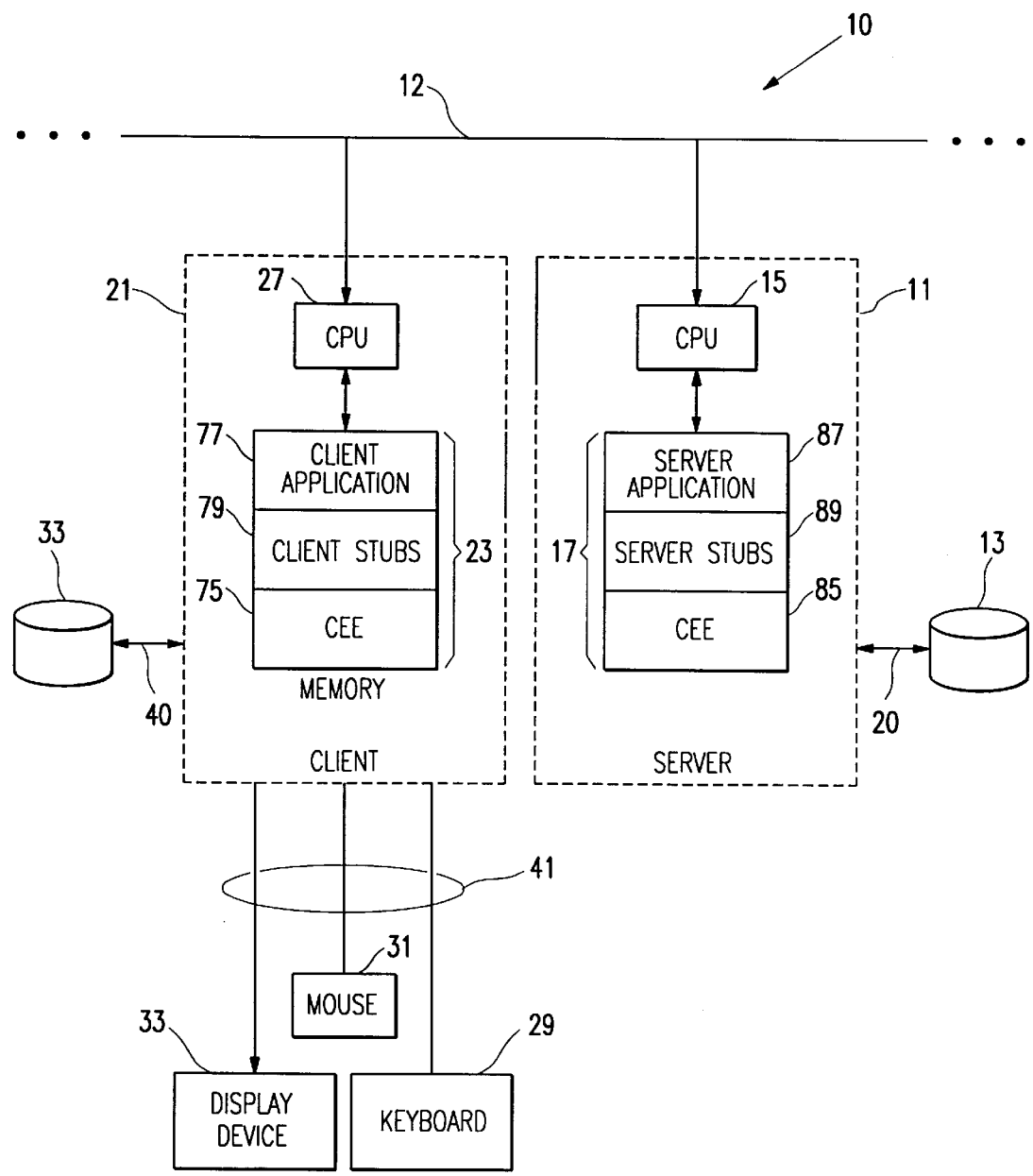
FIG. 1 is a diagram showing the distributed computing environment used with the data structure of the present invention.

As illustrated in FIG. 1, the data structure of the present invention is designed for use in a distributed (client/server) computing environment 10. The client and server systems are connected by network connections 12, such as internet connections or the connections of a local area network. The server computer 11 communicates over a bus of I/O channel 20 with an associated storage subsystem 13. The server system 11 includes a CPU 15 and a memory 17 for storing current state information about program execution. A portion of the memory 17 is dedicated to storing the states and variables associated with each function of the program which is currently executing on the client computer. The computer also includes a drive 25 for reading media such as a disk. The client computer 21 similarly includes a CPU 27 and associated memory 23, and an input device 29, such as a keyboard or a mouse and a display device 33, such as a video display terminal ("VDT"). The client CPU communicates over a bus or I/O channel 40 with a disk storage subsystem 33 and via I/O channel 41 with the keyboard 29, VDT 33 and mouse 31. The client CPU also includes a drive 35 capable of reading a computer-readable media, such as a disk.

The data structure of the present invention is designed to be used in conjunction with IDL compilers and code generators loaded in the client memory 23 and server memory 17. The data structure is based upon an IDL source file stored in memory 23 or in memory 17. The source file may also be contained on a computer-readable medium, such as a disk. The data structure of the present structure contains a parse tree representing the IDL source file. The data structure can be stored in memory 23 or in memory 17 or on a computer-readable medium, such as a disk. The data structure that represents the source file is referred to as a Pickled IDL Format ("PIF"). The PIF file can be accessed at run-time by clients and servers that use the interfaces defined in the source file. The parse tree contained in the PIF file is an array using array indices rather than pointers. The use of array indices permits the resulting parse tree to be language-independent. The first element of the array is unused. The second element of the array (index 1) is the root of the parse tree that acts as an entry point to the rest of the parse tree.

Figure 2:
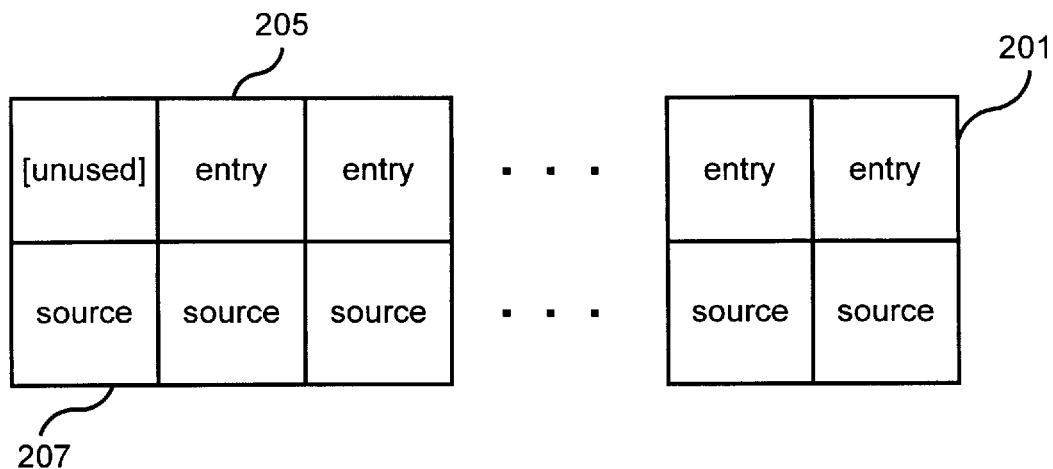
FIG. 2 is a diagram showing the data structure of the present invention.

The data structure, tu 201, is shown in FIG. 2, and defined in IDL as follows:

```
struct tu_def {
    sequence<entry_def>    entry;
    sequence<string>       source;
}
```

The data structure 201 contains a sequence (a variable-sized array) of parse tree nodes 205, each of type entry_def (defined below) and a sequence of source file lines 207. The sequence of source file lines 207 is a sequence of strings containing the actual source code lines from the IDL source file.

Figure 3:
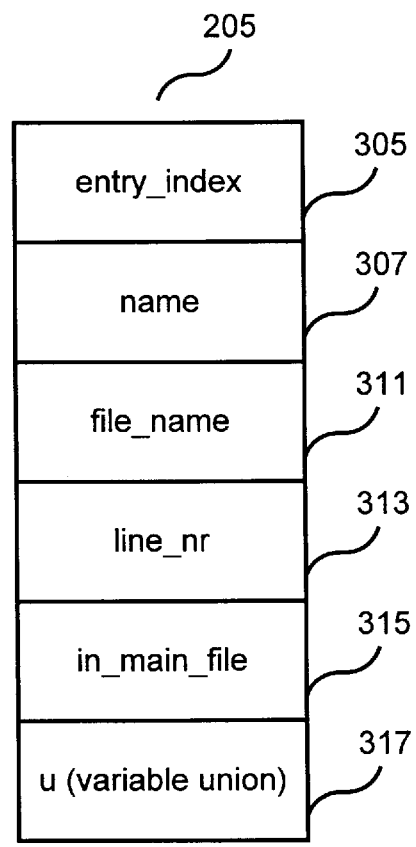
FIG. 3 is a diagram showing an entry data structure.

Each parse tree node (or "entry") 205 consists of a fixed part containing the name of the node and its properties as well as a variable portion that depends upon the node's type. The parse tree node is shown in FIG. 3 and defined in IDL as follows:

```
struct entry_def {
    unsigned long   entry_index;
    string          name;
    string          file_name;
    unsigned long   line_nr;
    boolean         in_main_file;
    union u_tag switch (entry_type_def) {
        case entry_argument: argument_def argument_entry;
        case entry_array: array_def array_entry;
        case entry_attr: attr_def attr_entry;
        case entry_const: const_def const_entry;
        case entry_enum: enum_def enum_entry;
        case entry_enum_val: enum_val_def enum_val_entry;
        case entry_except: except_def except_def_entry;
        case entry_field: field_def field_def entry;
        case entry_interface: interface_def interface_entry;
        case entry_interface_fwd: interface_fwd_def interface_fwd__entry;
        case entry_module: module_def module_entry;
        case entry_op: op_def op_entry;
        case entry_pre_defined: pre_defined_def pre_defined_entry;
        case entry_sequence: sequence_def sequence_entry;
        case entry_string: string_def string_entry;
        case entry_struct: struct_def struct_entry;
        case entry_typedef: typedef_def typedef_entry;
        case entry_union: union_def union_entry;
        case entry_union_branch: union_branch_def union_branch_entry;
    } u;
};
```

The fixed part of the parse tree node includes entry_index 305, an unsigned long which is the index for this particular entry in the parse tree. The unqualified name of the entry is contained in the field name 207, The name of the original IDL source file is contained in the field file_name 311. The field line_nr 313 contains the line number in the IDL source file that caused this parse tree node to be created. The boolean in_main_file 315 indicates whether or not the entry is made in the IDL source file specified on the command line or whether the entry is part of an "include" file. Following these fields, the parse tree node includes a variable portion—a union 317 having a discriminator, entry_type_def. The union discriminator, entry_type_def, specifies the type of node and which variant within entry_def is active. Entry_type_def is an enumeration defined as follows:

```
enum entry_type_def {
    entry_unused,
    entry_module,
    entry_interface,
    entry_interface_Fwd,
    entry_const,
    entry_except,
    entry_attr,
    entry_op,
    entry_argument,
    entry_union,
    entry_union_branch,
    entry_struct,
    entry_field,
    entry_enum,
    entry_enum_val,
    entry_string,
    entry_array,
    entry_sequence,
    entry_typedef,
    entry_pre_defined
};
```

Entry_type_def includes a list of the various types of parse tree entries. Each parse tree entry represents a constant integer that is used in the switch statement contained in entry_def. For each entry, the union Stag will include a different type of structure. The first enumerated value entry_unused corresponds to the value zero and is not used in determining the type of the union.

If the parse tree entry is a module (specified by the value entry_module) the variable portion of the parse tree entry is a data structure including a sequence of module definitions. Each module definition is an unsigned long acting as an index in the parse tree array.

If the parse tree entry is an interface, as specified by the value entry_interface, the variable portion of the parse tree is a data structure including a sequence of local definitions and a sequence of base interfaces from which this interface inherits. If the parse tree entry is a forward declaration of an interface (entry_interface_fwd), the union is an unsigned long containing the index of the full definition.

Constants (entry_const) are represented in a parse tree node as a structure containing the value of the constant. A union and switch/case statement are preferably used to discriminate between the various base type constants (boolean constant, char constant, double constant, etc. . .) that may be included in the source file.

Exceptions (entry_except) are represented in a parse tree node as a structure containing a sequence of fields. An attributes (entry_attr) is represented as a data structure containing a boolean value that indicates whether the attribute is read-only and an unsigned long that indicates the data type.

Figure 4:
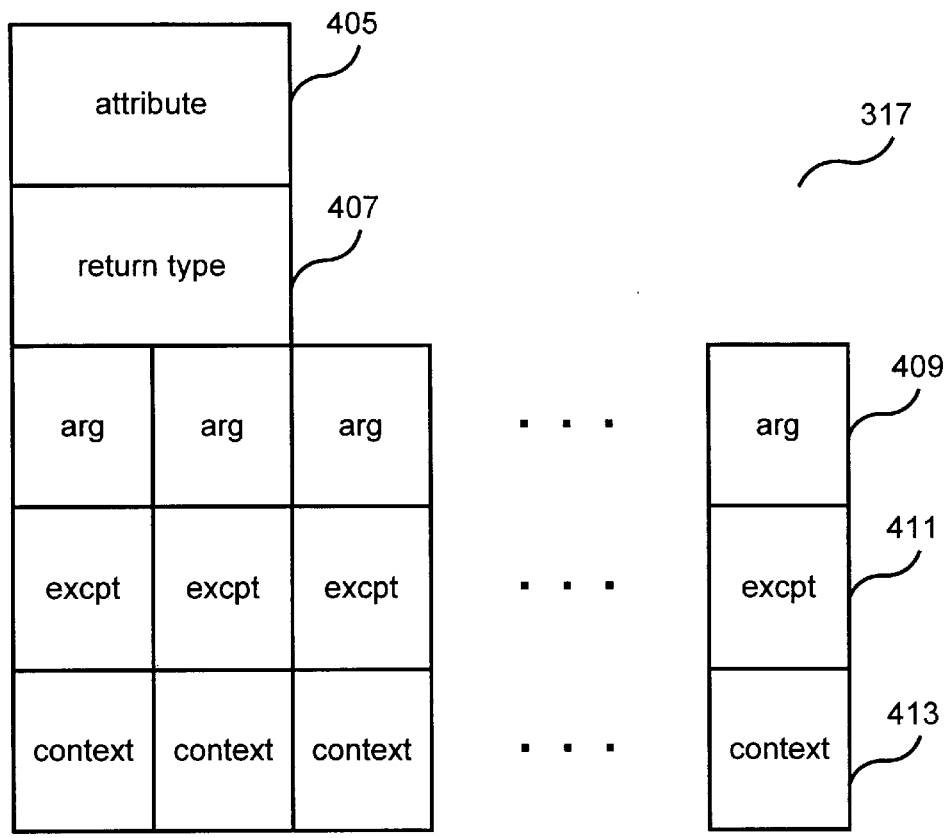
FIG. 4 is a diagram showing an operation data structure.

If the parse tree entry is an operation (op_def), the variable portion 317 of the entry data structure 205 is a data structure as shown in FIG. 4. The data structure 317 contains a boolean 405 that indicates whether or not the operation has a one-way attribute, an unsigned long 407 that indicates the return type, a sequence of arguments 409 to the operation, a sequence of exceptions 411 to the operation, and a sequence of strings 413 that specify any context included in the operation. If the parse tree entry is an argument to a particular operation (entry_argument), the variable portion of the parse tree entry is a structure containing unsigned longs that indicate the data type and direction of the argument.

Figure 5:
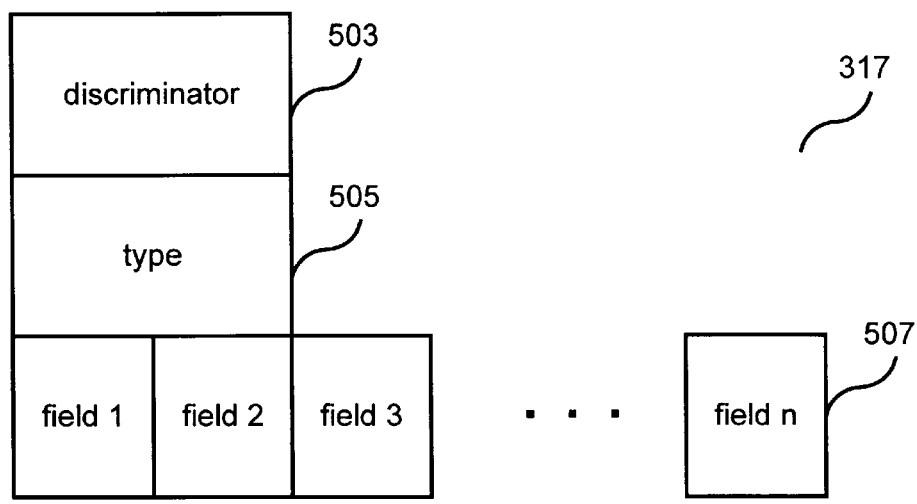
FIG. 5 is a diagram showing a union data structure.

If the parse tree entry is a union (entry_union), it is represented in the parse tree entry as shown in FIG. 5. The data structure 317 contains an unsigned long specifying the discriminator 503 and an unsigned long specifying the type 505. The type is preferably specified using an enumerated list of base types. The structure 317 further includes a sequence of the union's fields 507. If the parse tree entry is a union branch (entry_branch), the variable portion of the parse tree entry is a structure containing an unsigned long indicating the base type of the branch, a boolean indicating whether or not the branch includes a case label, and the value of the discriminator. Since the value is of a particular data type, preferably an enumerated list of the various base types is used to specify the value within the structure used to represent the union branch.

For data structures (entry_struct), the variable portion of the parse tree entry includes a structure containing a sequence of the specified structure's fields. Enumerated values (entry_enum) are represented by a structure containing a sequence of enumerated values. Enumerations of an enumerated type (entry_enum_val) are represented in the parse tree entry by a structure containing an unsigned long holding the enumeration's numerical value.

If the parse tree entry is a string (entry_string), the variable portion of the parse tree entry is a structure containing the string's maximum size. A maximum size of zero implies an unbounded string. An array (entry_array) is represented in the parse tree entry by a structure containing an unsigned long holding the array's base type and a sequence of longs holding the array's dimensions. A sequence (entry_sequence) is represented by a structure containing unsigned longs holding the sequence's base type and the sequence's maximum size.

For type definitions (entry_typedef), the parse tree entry includes a structure containing an unsigned long value indicating the type definition's base type. Predefined types (entry_pre_defined) are represented by a structure containing the data type. To specify the type, preferably an enumeration of the various base types are used.

Once the IDL source file has been described using the tu data structure, the data structure may be transported to a file or database using any known methods. Alternatively, the data structure may be transported to a file using the method described in U.S. application Ser. No. 08/680,203.

Having thus described a preferred embodiment of the data structure representing IDL source files, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computer-readable medium encoded with a data structure representing an Interface Definition Language source file, the data structure comprising:

a variable-sized array of entry data structures, each entry data structure describing an entry in the source file; and a variable-sized array of character strings, each character string containing a line in the source file.

2. The computer-readable medium, as recited in claim 1, wherein each entry data structure further comprises:

a field identifying a name of the entry;

a field identifying a line number in the source file where the entry is located; and a field describing characteristics of the entry.

3. The computer-readable medium, as recited in claim 2, wherein if the entry is a module, the field describing characteristics of the module further comprises a variable-sized array of definitions contained within the module.

4. The computer-readable medium, as recited in claim 2, wherein if the entry is an interface, the field describing characteristics of the interface further comprises a structure including a variable-sized array of definitions contained within the interface and a variable-sized array of interfaces from which the interface inherits.

5. The computer-readable medium, as recited in claim 2, wherein if the entry is an argument to an operation, the field describing characteristics of the argument further comprises a structure containing a data type and direction of the argument.

6. The computer-readable medium, as recited in claim 2, wherein if the entry is a union having a plurality of fields, the field describing characteristics of the union further comprises a structure containing a discriminator of the union and a variable-sized array of the plurality of fields.

7. The computer-readable medium, as recited in claim 2, wherein if the entry is a data structure having at least one field, the field describing characteristics of the data structure further comprises a variable sized array of the at least one field.

8. The computer-readable medium, as recited in claim 2, wherein if the entry is a declaration of a constant having a value, the field describing the constant declaration further comprises a structure containing the value of the constant.

9. The computer-readable medium, as recited in claim 2, wherein if the entry is a string having a maximum size, the field describing the string comprises a structure containing the maximum size of the string.

10. The computer-readable medium, as recited in claim 2, wherein if the entry is an array having a base type and a number of dimensions, the field describing characteristics of the array further comprises a data structure containing the base type of the array and the number of dimensions in the array.

11. The computer-readable medium, as recited in claim 1, wherein the data structure can be transported to a file.

* * * * *